(No Model.)
S. P. BUNCH.
CUTTING APPARATUS FOR HARVESTERS.
No. 370,762. Patented Oct. 4, 1887.
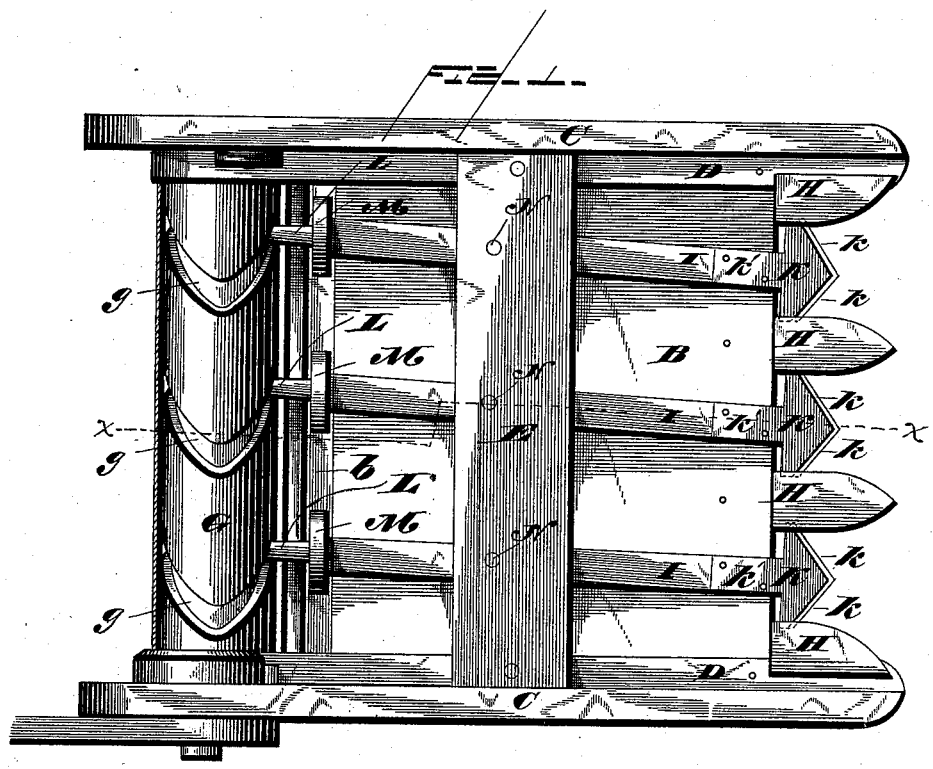
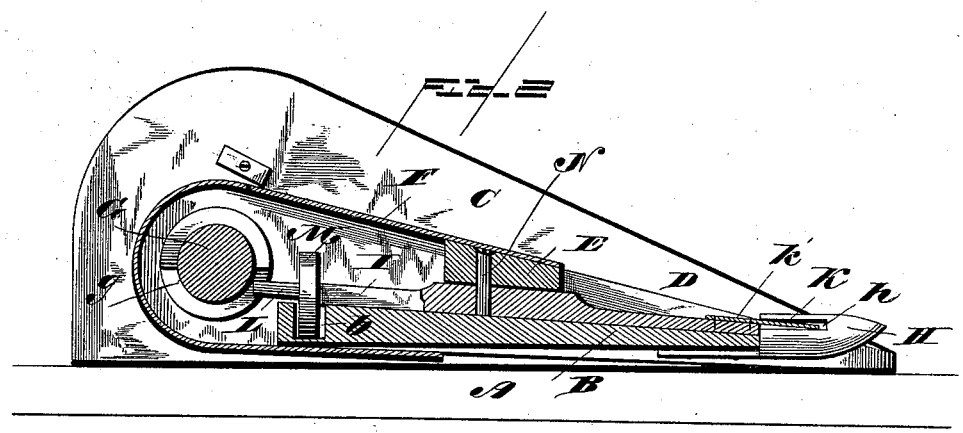
Witnesses
C. N. Dishiell
J. W. Garner
Inventor
Samuel P. Bunch
By his Attorneys
C. A. Snow & Co.
N. PETERS, Photo-Lithographer, Washington, D. C.

UNITED STATES PATENT OFFICE.

SAMUEL PLEASANT BUNCH, OF RICHLAND, MISSOURI.

CUTTING APPARATUS FOR HARVESTERS.

SPECIFICATION forming part of Letters Patent No. 370,762, dated October 4, 1887.

Application filed December 17, 1886. Serial No. 221,871. (No model.)

*To all whom it may concern:*

Be it known that I, SAMUEL PLEASANT BUNCH, a citizen of the United States, residing at Richland, in the county of Pulaski and State of Missouri, have invented a new and useful Improvement in Cutting Apparatus for Harvesters, of which the following is a specification.

My invention relates to an improvement in cutting apparatus for harvesters; and it consists in the peculiar construction and combination of devices, that will be more fully set forth hereinafter, and particularly pointed out in the claims.

In the drawings, Figure 1 is a top plan view of a cutting apparatus embodying my improvements, a portion of the frame being cut away, so as to disclose subjacent mechanism. Fig. 2 is a vertical longitudinal sectional view taken on the line *x x* of Fig. 1.

A represents the platform of the harvester, which is provided with the base-plate B, the side guards, C, and the beams D, which are arranged at the ends of the platform. These beams are connected by a longitudinal bar, E, the ends of which are secured to the upper sides of the beams D, and the said bar E is arranged at a suitable distance above the base-plate B. A plate or cover, F, is secured on the upper sides of the bar E and beams D, so as to cover the cutting mechanism and prevent the grain or hay from falling thereon. The rear ends of the beams D project beyond the rear side of the base-plate, and in the said rear projecting ends of the beam is journaled a roller, G. This roller is provided with zigzag cam-grooves *g*. In the rear edge of the plate B, on the upper side thereof, is made a longitudinal slot, *b*, and to the front sides of the said plate are secured fingers H, which project from the outer edge thereof. The said fingers are provided with the usual longitudinal horizontal slots, *h*.

I represents a series of vibrating levers, which are pivoted under the bar E, as shown. To the front ends of the said vibrating levers are bolted cutting-knives K, which are of the usual shape and have the converging sides *k*, which are sharpened to a cutting-edge, as shown. Each of the said knives K is provided with a rearwardly-extending shaft, *k'*, that bears on the upper side of the vibrating lever and is bolted thereto, as shown. The rear ends of the vibrating levers I are reduced to form spindles L, which engage the cam-grooves *g* of the roller G, and on the said spindles are journaled anti-friction rollers M, which travel in the groove *b* of the base-plate.

From the foregoing description it will be very readily understood that when the roller G is rotated the levers I are rocked or vibrated and the cutting-plates K are caused to oscillate between the fingers H, so as to cut the grain or hay as the machine advances. Motion is communicated to the roller G from the driving mechanism of the mower or harvester by any suitable means, and I do not desire to limit myself in this particular.

In order to prevent the cutting-knives or the vibrating levers I from becoming broken when the machine encounters twigs or stones or other obstructions, I make the fulcrum pins or bolts N, on which the said vibrating levers are pivoted, of only sufficient strength to withstand the strain exerted upon them when the machine is cutting grain or hay. As soon as any unusual strain is exerted upon one of the cutters, the fulcrum-pin on which the vibrating lever is pivoted breaks, and thus prevents injury from being done to the cutter or its vibrating lever.

The broken fulcrum-pin can be readily replaced by a new one in a very short time and at a slight cost.

Having thus described my invention, I claim—

1. In a cutting mechanism of a harvester or mower, the combination of the base-plate B, having the groove *b* at its rear side and the fingers H at its front side, with the levers I, having the cutting-knives K, to oscillate between the fingers, the rollers M, journaled on the levers and adapted to travel in the groove *b*, and means, substantially as set forth, to vibrate the levers I, substantially as described.

2. In the cutting mechanism of a harvester or mower, the combination of the base-plate B, having the groove *b* at its rear side, the oscillating levers I, the frangible pins N, to pivot the levers I to the base-plate, the cutting-knives K, attached to the front ends of the levers I, and the rollers M, journaled on the levers and adapted to travel in the groove $b$, substantially as described.

3. In the cutting mechanism of a harvester, the combination of the base-plate B, having the groove $b$ at its rear side and the fingers H at its front side, the rotating cylinder having the grooves $g$, the fulcrumed levers I, having the cutting-knives at their free ends to oscillate between the fingers, the rollers M, journaled on the levers and adapted to travel in the groove $b$, and the plate or cover F, to cover the cutting mechanism, substantially as described.

In testimony that I claim the foregoing as my own I have hereto affixed my signature in presence of two witnesses.

SAMUEL PLEASANT BUNCH.

Witnesses:
  M. W. WRIGHT,
  S. J. MANES.